Patented Apr. 26, 1927.

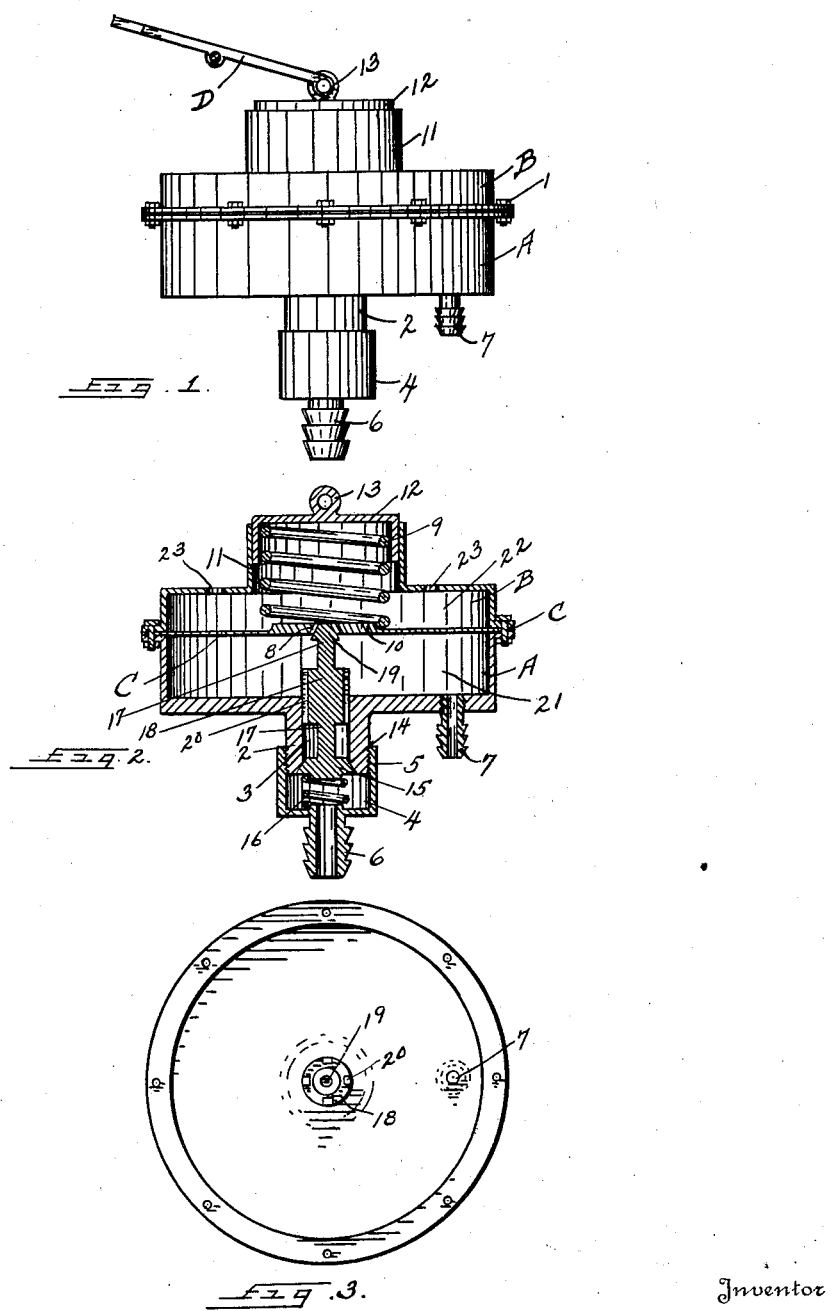

1,626,045

UNITED STATES PATENT OFFICE

ROBERT E. MITTON, OF SALT LAKE CITY, UTAH.

VALVE.

Application filed April 7, 1926. Serial No. 100,352.

My invention relates to valves and has for its object to provide a new and efficient valve for the control of air or fluids.

A further object is to provide a valve for the controlling of air from a main storage tank to any desired destination and primarily for use in automobiles.

A still further object is to provide an air control valve for controlling the air used in operating the brakes on an automobile wherein the back pressure, built up in the air lines leading to the brakes, will automatically cut off the supply of air until more air is desired by the operator.

These objects I accomplish with the device illustrated in the accompanying drawings in which similar numerals and letters of reference indicate like parts throughout the several views and as described in the specification forming a part of this application, and pointed out in the appended claims.

In the drawings I have shown the best and most preferred method of building my invention. Figure 1 is a side elevation of my invention. Figure 2 is a transverse vertical section of the invention, and Figure 3 is a plan view of the lower half of the device, showing the outlet opening and the top of the inlet valve.

In the drawings I have shown the flanged casing in which my valve is constructed as A, to which a closure cap B is secured by the bolts 1. A diaphragm C is mounted between the flanged portions of said casing, and cap, and is held in fixed relation thereto by the pressure of the bolts 1. Centrally on the outer side of said casing, I provide an externally threaded cylindrical sleeve, portion 2, which portion is centrally bored as at 3, and its extreme end is internally chamfered to form the valve seat 14 therein. A closure cap 4 having internal threads 5 in one end thereof is screwed on the external threads of the cylindrical portion 2 of the casing A. A hose connection 6 is provided on the free end of the said cap 4 for connecting the said casing with the source of air supply, and another outlet air connection 7 is externally threaded and screwed into the bottom of the said casing, to which the hose line leading to the brakes of the vehicle are connected.

The said diaphragm C is centrally bored and chamfered to form a valve seat 8, and a raised portion 10 is provided on the upper side thereof to hold a spring 9 in central position over the top of said diaphragm. A cylindrical flange or housing 11 is provided on the upper face of the said cap B, and in which a cup 12 is slidably carried. The said cup 12 is provided with an eye bolt 13 on its upper flat face, to which a lever D may be attached for operating the control valve. The said spring 9 is carried in the cup 12, and rests on the upper face of the diaphragm C around the raised portion 10, and is compressed by sliding the said cup 12 longitudinally within the said cylindrical housing 11. A valve 15 is held in normally closed position in the seat 14 of the cylindrical portion 2 of the casing A, by the pressure of a spring 16, carried between the head of said valve 15 and the inner face of the cap 4. A valve stem 17 is provided on the upper side of the said valve 15, and has an enlarged guide member 18 medially thereon, which guide member is longitudinally slidable within the central bore of the casing A. On the free end portion of the said valve stem 17, a valve head 19 is provided which valve seats in the seat 8 of the diaphragm C. The said guide member 18 of the valve stem 17 is milled on its periphery to form air slots or grooves 20 to allow passage of air therethrough. Ports 23 are provided through the upper face of the cap B, to allow escapement of air.

The operation of my valve is as follows:—
With the required amount of air in the supply tank now shown, the lever D connected with the eye bolt 13 is manually operated to move the cup 12, and compress the spring 9. The pressure of the spring 9 against the diaphragm C flexes the diaphragm C and closes the valve 19. When the valve 19 is seated, further compression of the spring 9 moves the stem 17 in the bore 3, and opens the valve 15. The air then enters through the connection 6, and passes through the bore 3 and into the chamber 21 of the casing A. The air from the chamber 21 is directed through the hose connection 7 to the brakes of the vehicle. When the brakes have been applied and the pressure of the air in the air lines has built up sufficient back pressure, the diaphragm C is raised by said pressure, and the valve 15 will be seated in its seat 14, shutting off the supply of air from the air supply tank. Should more air be desired, the operator forces the diaphragm C farther down until the desired amount of air is again introduced through the valve 15. When the operator desires to release the brakes, the lever will be released and the diaphragm will automatically assume a normal plane, and contact with the valve 19, and move the stem 17 and open the valve 14 which will allow the air to escape through the seat 8 and into the chamber 22 of the cap B, and from there through the ports 23 in the upper face thereof. The spring 16 holds the valve 15 normally seated at all times, and the spring 9 has only sufficient pressure to hold the diaphragm C in normal position with the valve 19 normally open, so that no air is left in the air lines leading to the brakes, or in the brakes when they are released.

Having thus described my invention, I desire to secure by Letters Patent and claim:—

A control valve comprising a cylindrical casing having a centrally extended sleeve flange on each end, and with a valve seat formed on one of said flanges; a cup slidable within one of said sleeve flanges; a valve seat formed on the other of said flanges; an air line connection screwed thereon; a diaphragm secured in said casing, and having a valve seat thereon; a valve stem slidably carried in one of said sleeve flanges; and a valve on each end of said stem.

In testimony whereof I have affixed my signature.

ROBERT E. MITTON.